US011816232B2

(12) United States Patent
Daftary et al.

(10) Patent No.: US 11,816,232 B2
(45) Date of Patent: Nov. 14, 2023

(54) PRIVACY SCORE

(71) Applicant: Allstate Insurance Company, Northbrook, IL (US)

(72) Inventors: Siddharth Daftary, Chicago, IL (US); Marvin Lu, Chicago, IL (US); Jessica Schapiro, Chicago, IL (US); Jacob Stewart, Arlington Heights, IL (US); Shashin Patel, Chicago, IL (US); Michael Sharp, Chicago, IL (US); Jhanani Dhakshnamoorthy, Boothwyn, PA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/573,996

(22) Filed: Jan. 12, 2022

(65) Prior Publication Data

US 2022/0138331 A1 May 5, 2022

Related U.S. Application Data

(63) Continuation of application No. 16/536,020, filed on Aug. 8, 2019, now Pat. No. 11,238,169.

(51) Int. Cl.
 *G06F 21/60* (2013.01)
(52) U.S. Cl.
 CPC ................... *G06F 21/604* (2013.01)
(58) Field of Classification Search
 CPC .................................................... G06F 21/604
 See application file for complete search history.

(56) References Cited

U.S. PATENT DOCUMENTS

| 10,268,976 | B2 * | 4/2019 | Rasumov | G06Q 10/0635 |
|---|---|---|---|---|
| 10,771,347 | B2 | 9/2020 | Balabine | |
| 10,838,987 | B1 * | 11/2020 | Edwards | G06F 16/288 |
| 2005/0125259 | A1 | 6/2005 | Annappindi | |
| 2007/0294195 | A1 | 12/2007 | Curry et al. | |
| 2008/0103800 | A1 | 5/2008 | Domenikos et al. | |
| 2009/0012716 | A1 | 1/2009 | Urdea et al. | |
| 2013/0282605 | A1 * | 10/2013 | Noelting | G06Q 10/10 |
| | | | | 705/321 |
| 2014/0200929 | A1 | 7/2014 | Fitzgerald et al. | |
| 2015/0074579 | A1 * | 3/2015 | Gladstone | G06Q 50/01 |
| | | | | 726/25 |

(Continued)

OTHER PUBLICATIONS

Ranking Digital Rights—2019 Corporate Accountability Index, archived on Jul. 29, 2019, and retrieved from: web.archive.org/web/20190729140823/https://rankingdigitalrights.org/index2019/report/privacy.

(Continued)

*Primary Examiner* — Richard A McCoy
(74) *Attorney, Agent, or Firm* — Brooks Kushman P.C.

(57) ABSTRACT

Methods, computer-readable media, software, and apparatuses may calculate and inform a consumer of company privacy scores corresponding to companies with which the consumer has a corresponding account, or for a company associated with a website that a consumer may visit. A consumer privacy score may also be determined, based on the company privacy scores. The company privacy scores may be based on a calculation including elements of a privacy practice of the corresponding company and elements of a privacy policy of the corresponding company.

10 Claims, 8 Drawing Sheets

(56) References Cited

U.S. PATENT DOCUMENTS

| | | |
|---|---|---|
| 2016/0164915 A1 | 6/2016 | Cook |
| 2016/0205126 A1 | 7/2016 | Boyer et al. |
| 2017/0048267 A1 | 2/2017 | Yampolskiy et al. |
| 2018/0027001 A1 | 1/2018 | Park et al. |
| 2018/0091542 A1* | 3/2018 | Bachner .................. H04L 63/20 |
| 2018/0255047 A1* | 9/2018 | Cicchitto .............. H04L 63/083 |
| 2018/0300800 A1* | 10/2018 | Rajkhowa ............ G06Q 10/083 |
| 2019/0028516 A1* | 1/2019 | Sander .................... G06F 21/56 |
| 2019/0034846 A1 | 1/2019 | Mo et al. |
| 2019/0050563 A1* | 2/2019 | Sander .................. G06F 16/287 |
| 2019/0124109 A1* | 4/2019 | Foster ................... H04L 67/306 |
| 2019/0319987 A1* | 10/2019 | Levy ....................... G06F 21/45 |
| 2020/0020038 A1 | 1/2020 | Haile et al. |
| 2020/0351292 A1* | 11/2020 | Sander ................ H04L 63/1433 |
| 2022/0319677 A1* | 10/2022 | Johnson ............ G06F 16/24564 |

OTHER PUBLICATIONS

Oct. 21, 2020 (WO) International Search Report & Written Opinion—PCT/US20/45315.

\* cited by examiner

PRIVACY SCORE

CROSS-REFERENCE TO RELATED APPLICATIONS

This application is a continuation of U.S. application Ser. No. 16/536,020 filed Aug. 8, 2019, now U.S. Pat. No. 11,238,169, issued Feb. 1, 2022, the disclosure of which is hereby incorporated in its entirety by reference herein.

TECHNICAL FIELD

Aspects of the disclosure generally relate to methods and computer systems, including one or more computers particularly configured and/or executing computer software. More specifically, aspects of this disclosure relate to systems for determining and informing a consumer of company privacy scores corresponding to companies, including those with which the consumer has an account, and for determining and informing a consumer of their own privacy score.

BACKGROUND

A consumer's awareness of their own privacy in today's online environment is difficult due to the increased connectivity and the increased number of consumer accounts accessible via web enabled computing devices. Consumers today have a large number of online accounts, and keeping track of them is sometimes difficult and can be time consuming. Many consumers have accounts that they have long forgotten about, but those accounts may still be active. Further, consumers do not understand how the companies with which they have these accounts are using or protecting their personal data, in part due to long and complex privacy policies. Consumers do not understand what data companies are collecting, how that data is being used or shared, and what rights they have to that data (ability to delete, edit, etc.). It is important from a personal privacy perspective that the consumer be aware of all of their online accounts and be informed about the privacy practices of the companies with which they have these accounts.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for use by a consumer in order to keep track of a consumer's accounts and to understand privacy practices associated with the companies providing those accounts. The discovered accounts may be listed and displayed to the consumer, along with a company privacy score associated with each account. In addition, the company privacy scores may be generated or calculated, based on various measures related to company privacy practices and/or company privacy policies.

In some aspects, a cyber-privacy system may include a cyber-privacy account analysis system and a cyber-privacy data processing system The cyber-privacy system may include at least one processor and a memory unit storing computer-executable instructions. In some embodiments, the computer-executable instructions may be stored in one or more non-transitory computer-readable media. The cyber-privacy system may be configured to, in operation, monitor at least one email account of the consumer. The cyber-privacy system may be configured to, in operation, determine source information for each email correspondence in the monitored at least one email account. Based on the determined source information for each email correspondence, the cyber-privacy system may generate a list of companies associated with the consumer. The cyber-privacy system may, in operation, also determine for each email correspondence a likelihood that the email correspondence represents an account of the consumer. Based on the determined likelihood that each email correspondence represents an account of the consumer, the cyber-privacy system may generate a list of accounts associated with the consumer.

In other aspects, the cyber-privacy system may also be configured to, in operation, monitor at least a consumer's internet browser history and internet browser cache in addition to a consumer's email accounts. The cyber-privacy system may be configured to, in operation, generate a list of companies associated with the consumer based on a consumer's internet browser history and internet browser cache. Using the list of companies created from the analysis of a consumer's email, browser history, and browser cache, the cyber-privacy system may, in operation, also determine the likelihood whether a consumer has an account with the companies.

In some aspects, the cyber-privacy system may, in operation, determine and provide an indication of a company privacy score for each company that the consumer has an account with. In some aspects, the cyber-privacy system may, in operation, determine and provide an indication of a company privacy score for a company associated with a website that a consumer may visit. The cyber-privacy system may be configured, in operation, to determine and provide a consumer's privacy score, in addition to the company privacy scores. The cyber-privacy system may also determine and provide information related a trend in a company privacy score and/or the consumer's privacy score.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for providing consumers with information about company privacy practices of companies associated with the consumer's accounts. A consumer may be presented with a listing of accounts and a company privacy score associated with each account. A consumer may also be presented with information corresponding to their own privacy score. A consumer may be presented with a privacy score of a website they navigate to, or of a company associated with the website.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
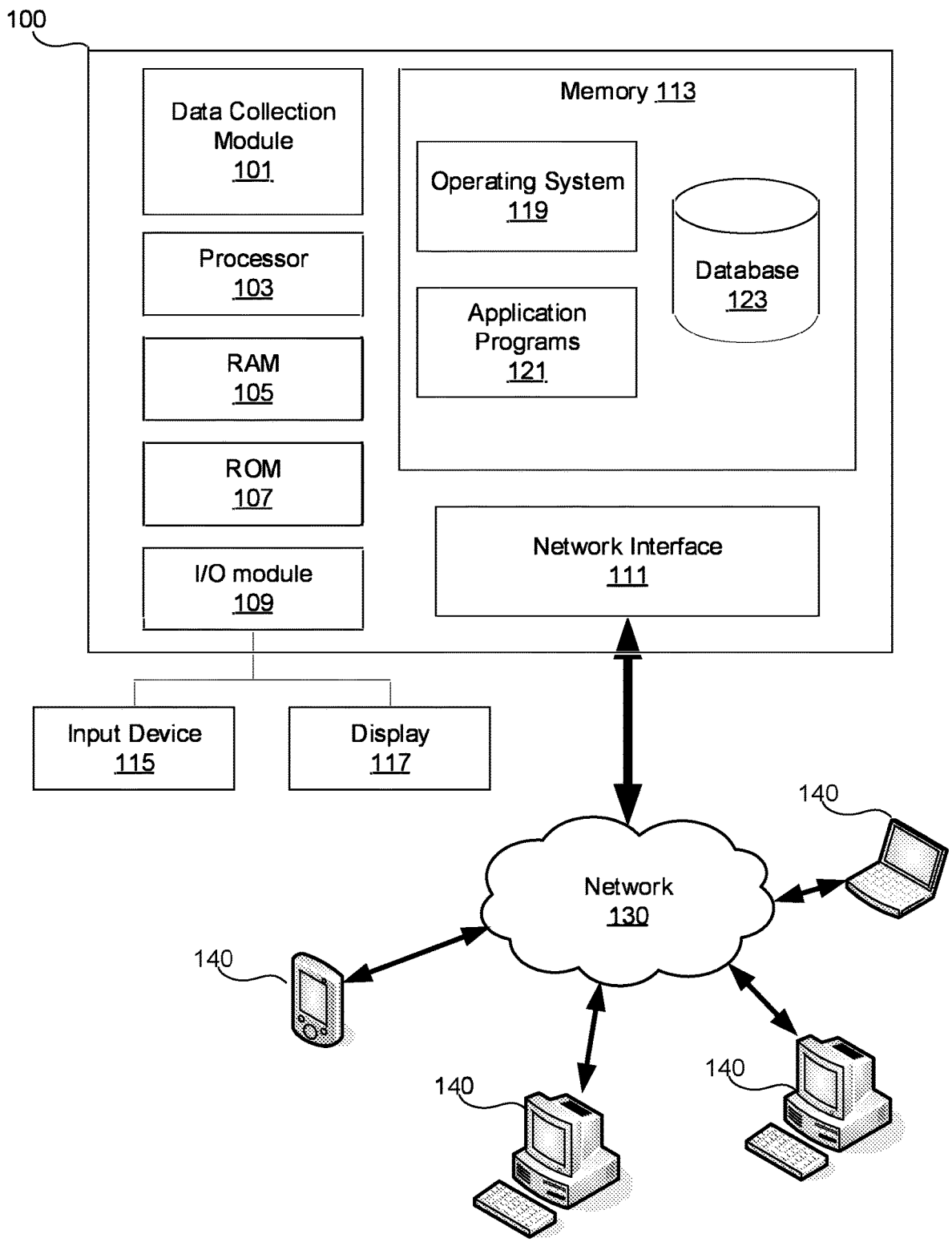
FIG. 1 illustrates an example cyber-privacy device that may be used in accordance with one or more aspects described herein.

In one or more arrangements, aspects of the present disclosure may be implemented with a computing device. FIG. 1 illustrates a block diagram of an example cyber-privacy device 100 that may be used in accordance with aspects described herein. The cyber-privacy device 100 may be a computing device, such as a personal computer (e.g., a desktop computer), server, laptop computer, notebook, tablet, smartphone, vehicles, home management devices, home security devices, smart appliances, etc. The cyber-privacy device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, cyber-privacy device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the cyber-privacy device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The 1/0 module 109 may be configured to be connected to an input device 115, such as a microphone, keypad, keyboard, touchscreen, and/or stylus through which a user of the cyber-privacy device 100 may provide input data. The 1/0 module 109 may also be configured to be connected to a display device 117, such as a monitor, television, touchscreen, etc., and may include a graphics card. The display device 117 and input device 115 are shown as separate elements from the cyber-privacy device 100; however, they may be within the same structure. On some cyber-privacy devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-privacy device 100 to perform various functions. For example, memory 113 may store software used by the cyber-privacy device 100, such as an operating system 119 and application programs 121, and may include an associated database 123.

The network interface 111 may allow the cyber-privacy device 100 to connect to and communicate with a network 130. The network 130 may be any type of network, including a local area network (LAN) and/or a wide area network (WAN), such as the Internet, a cellular network, or satellite network. Through the network 130, the cyber-privacy device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as cyber-privacy device 100. In some embodiments the cyber-privacy monitoring device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface 111 may include a modem Further, the network interface 111 may use various protocols, including TCP/IP, Ethernet, File Transfer Protocol (FTP), Hypertext Transfer Protocol (HTTP), etc., to communicate with other computing devices 140.

Figure 2:
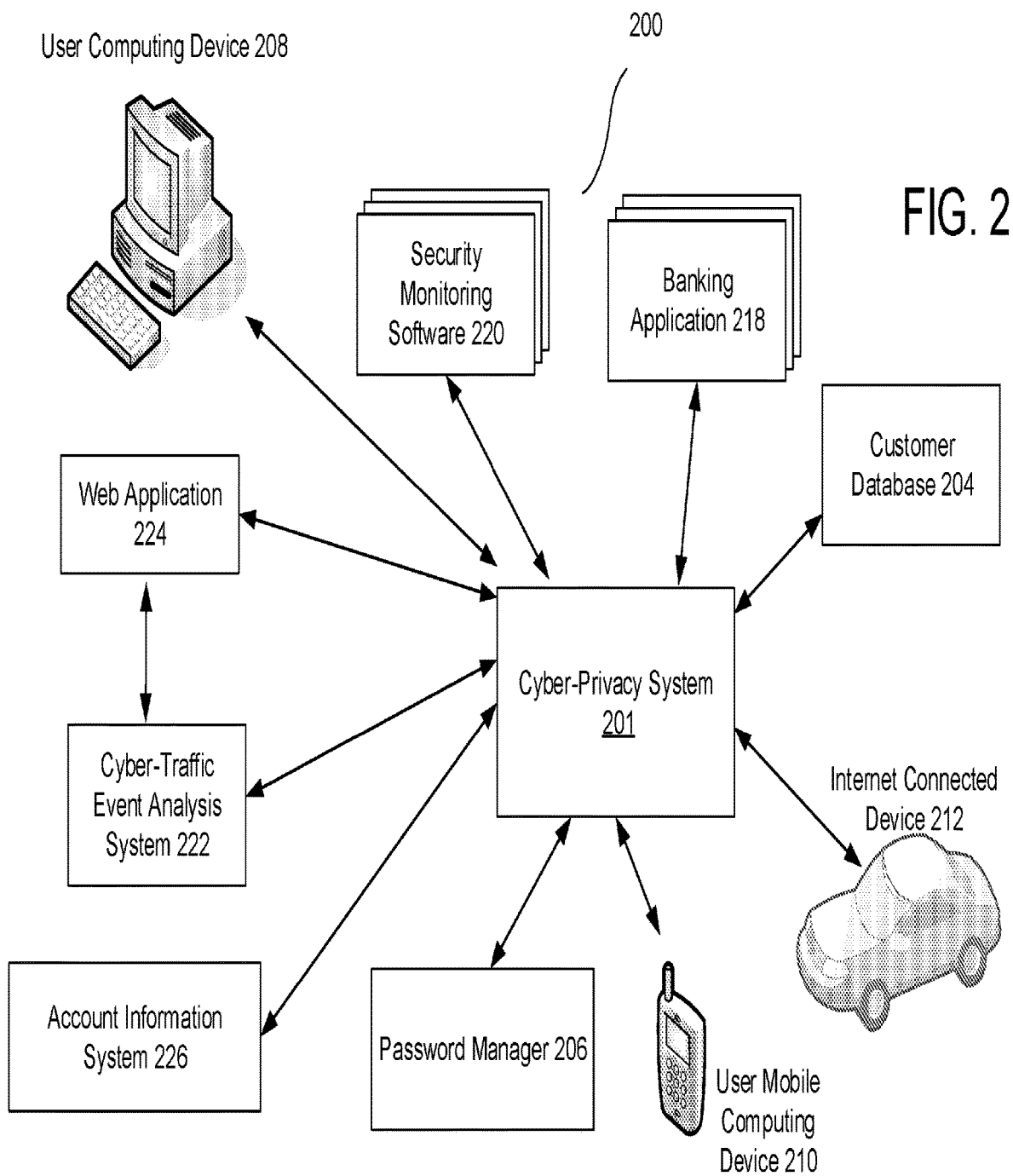
FIG. 2 shows a block diagram illustrating the system architecture for a cyber-privacy system in accordance with one or more aspects described herein.

FIG. 2 shows a block diagram illustrating system architecture 200 for a cyber-privacy system A cyber-privacy system 201 may collect information from and transmit information to a consumer through various different channels such as a user mobile computing device 210, a user computing device 208, a password manager 206, banking application 218, and a web application 224. In some instances, the cyber-privacy system 201 may be a cyber-privacy computing device 100. Cyber-privacy system 201 may receive user data for consumers through channels such as customer database 204, internet connected device 212, account information system 226, and cyber-traffic event analysis system 222. The cyber-privacy system 201 may communicate with one or more network-based accounts to detect information associated with a consumer account being communicated through a network.

In some embodiments, cyber-privacy system 201 may collect information from and transmit information to each of the various applications, databases, devices, and backend servers described in FIG. 2. Cyber-privacy system 201 may collect information about consumers such as their real-time activity and interactions.

In some embodiments, cyber-privacy system 201 may communicate with a user (e.g., a consumer) and gather user data through banking application 218. Cyber-privacy system 201 may collect user data from interactions of the user with the user interface of the banking mobile application 218. The banking application 218 may allow the user to manage account preferences, manage accounts, view recent transactions, and/or review suspicious behavior. Cyber-privacy system 201 may track interactions with banking applications and/or receive notifications from the applications.

In an embodiment, cyber-privacy system 201 may initiate a scan for consumer accounts. The cyber-privacy system 201 may request login information from the consumer. Accounts may be determined according to one or more methods. For example, the consumer may supply the cyber-privacy system 201 with identifying information, such as a name, date of birth, address, social security number, or other such information. The cyber-privacy system 201 may integrate with one or more services (such as social media websites, banking websites, etc.) which may inform the cyber-privacy system 201 whether the identifying information corresponds to an account on each service. In some embodiments, the consumer may supply the cyber-privacy system 201 with access to an aggregation service, such as a password manager, which may identify known accounts and/or credentials for each account. In some instances, the cyber-privacy system 201 may find account data across numerous services.

In some embodiments, a password manager 206 may assist the cyber-privacy system 201 in determining the presence of consumer-associated accounts. The password manager 206 may inform the cyber-privacy system 201 of known accounts associated with the password manager 206, as well as the status of the credentials associated with those accounts. In some instances, the cyber-privacy system 201 may compare the accounts known to the password manager 206 with other accounts known to the cyber-privacy system 201 to determine what accounts are protected through password management.

In some embodiments, the user may interact with the cyber-privacy system 201 using the user computing device 208, web application 224, and/or user mobile computing device 210. The user may be able to view a current privacy score, see listings of all of their accounts, and see company privacy scores associated with the accounts.

In some embodiments, the cyber traffic event analysis system 222 may monitor user activity on social media networks or the Internet in general. In some instances, the cyber-traffic event analysis system 222 may determine how much of a consumer's confidential (e.g., private) information is available electronically. Confidential information may comprise identity information such as name or birthday, marital status, family members, education, employment histories, online identities (e.g., user names on a social media account), financial information (e.g., banking numbers, credit card numbers, etc.), traceable assets (real estate, vehicles, etc.), court records, or other such information. By searching for electronically available information, the system may determine a "digital footprint" (e.g., a trail of data and information, available electronically and associated with the consumer). For example, the cyber-traffic event analysis system 222 may determine that a consumer's home address is available on 3 social media sites and 5 public web pages.

In some embodiments, in addition to collecting user information from mobile applications and web applications, user information may be collected from various other channels such as user computing device 208, user mobile computing device 210, and internet connected device 212. The cyber-privacy system 201 may determine devices associated with the consumer. The cyber-privacy data processing system 302 may determine characteristics of those devices, such as their operating systems, update history, software on the devices, hardware characteristics, and so forth.

In some embodiments, the account information system 226 may maintain and dynamically update records of accounts for a consumer. For example, the account information system 226 may interface with social networking accounts associated with the consumer in order to gather updates to the accounts.

In an embodiment, the collected user information may be used to generate a consumer profile for the consumer. The consumer profile may be updated periodically as new consumer information is gathered or received. In an embodiment, a consumer profile may be a categorization of what other or external entities know about the user such as what marketers know about a user, information found on social media about the user, the home state of the user and other potential categorizations.

Figure 3:
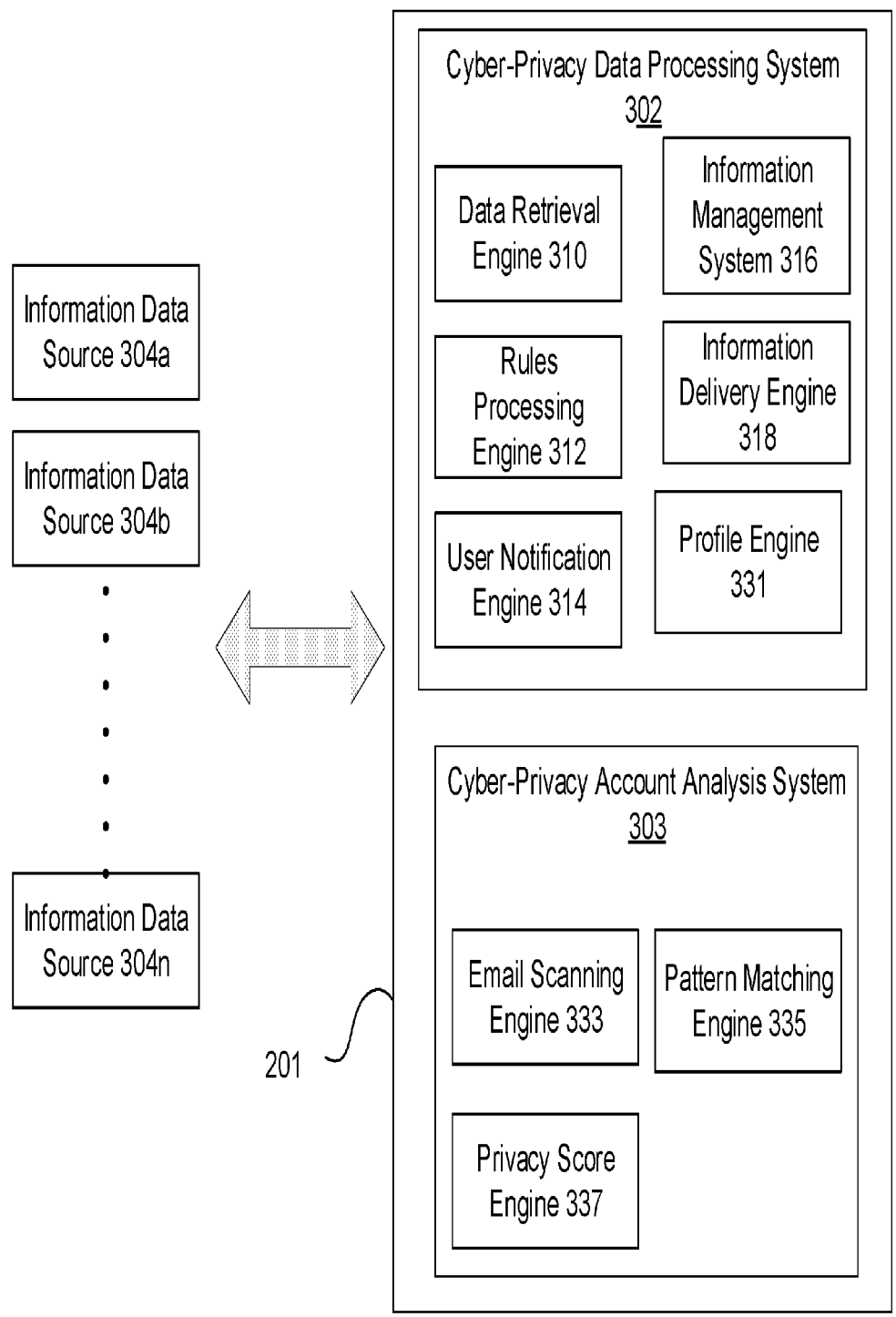
FIG. 3 illustrates a block diagram of a cyber-privacy system that collects information from various information data sources to assist a consumer in keeping track of numerous accounts in accordance with one or more aspects described herein.

FIG. 3 illustrates a block diagram of a cyber-privacy system 201 that collects information from various information data sources to assist a consumer in keeping track of numerous accounts and to provide the consumer with privacy scores corresponding to those accounts. As shown in FIG. 3, the cyber-privacy system 201 may communicate with a plurality of information data sources 304*a*, 304*b* . . . 304*n* to collect information related to the consumer and the consumer's accounts.

In some embodiments, the cyber-privacy system 201 may comprise a cyber-privacy data processing system 302 and a cyber-privacy account analysis system 303. The cyber-privacy data processing system 302 may retrieve information from the plurality of information data sources 304*a*-304*n* in order to determine the digital presence of a consumer. The data retrieval engine 310 may be configured to monitor (e.g., continuously monitor) each of the information data sources 304*a*-304*n* and report data of interest from any one of these data sources to the cyber-privacy system 201. For example, the data retrieval engine 310 may monitor social media sources to determine if account information associated with the consumer has been detected. If the information is detected, it may be passed on to the cyber-privacy system 201 for analysis. In another example, the data retrieval engine 310 may interface with one or more digital accounts (banking accounts, social media accounts, digital storefronts, etc.) to determine if accounts have been created, are active, and/or in use. Account information may be passed on to the cyber-privacy system 201.

In an embodiment, the collected information regarding a consumer may be used to determine an online presence for a consumer (e.g., the spread of information or "footprint" left by a consumer in digital spaces).

In an embodiment, determined social media sources of the consumer may be monitored to determine if something malicious or believed to breach the terms of use of the site has been detected.

In an embodiment, cyber-privacy data processing system 302 may generate a consumer profile at profile engine 331. The consumer profile may be generated using at least in part data received and/or collected from information data sources 304a-304n. The consumer profile may include details of the consumer including but not limited to a consumer's name, age, address, driver's license number, credit card, or bank information, insurance policies, networked devices associated with the consumer etc. In an embodiment, the consumer may themselves enter additional information or confirm information found in their consumer profile through a mobile application or a computing device interface. Additional information that may be entered by the consumer may include account details and/or verification of online accounts used by a consumer.

In some additional embodiments, cyber-privacy account analysis system 303 may generate a listing for the consumer of discovered online accounts associated with the consumer. The accounts may be categorized into various groups such as financial accounts and subscriptions associated with the consumer. The categorized listings may assist a consumer in keeping track of their numerous online accounts, all of which may contain various forms of personal or confidential information.

In an embodiment, email scanning engine 333 may monitor or scan a consumer's email accounts to determine a listing of the consumer accounts and determine companies providing those accounts. Similarly, a consumer's email accounts may also be monitored to determine the accounts associated with the consumer.

In an embodiment, cyber-privacy account analysis system 303 may generate separate lists for a consumer listing all of the consumer's discovered accounts and all of the consumer's online subscriptions. The generated lists may be used to assist the consumer in closing unused or unwanted accounts in order to reduce the risk of confidential information being obtained and to prevent unauthorized use of accounts a user may have long forgotten about. In another embodiment, cyber-privacy account analysis system 303 may, upon discovery of consumer's accounts, allow the consumer to globally change information, such as a consumer address or phone number, across all of the discovered accounts simultaneously. The aggregation and consolidation mechanism of the present disclosure may allow a consumer to update and manage numerous accounts efficiently.

In an embodiment, cyber-privacy account analysis system 303 may determine company privacy scores for each company associated with a consumer's accounts. For example, privacy score engine 337 may calculate a company privacy score for one or more companies based on information received from information data sources 304a-304n. In some embodiments, the company privacy score may be based in part on a privacy policy of the company. In some embodiments, the company privacy score may be based in part on privacy practices of the company. The components of the company privacy score listed above are merely exemplary components, and any number of other components may be used in determining the company privacy score.

In some embodiments the company privacy score may be a numeric value determined by adding one or more points for each of a number of company practices and/or policies that have been determined to contribute to protecting a consumer's privacy. For example, one or more points may be added to a company privacy score for being in compliance with any of the following practices/policies:

Data is stored securely, for example, in an encrypted format or database;

Data is accessible to company employees and any third parties only on a need-to-know basis;

The consumer is able modify or delete specific personal information held by the company;

The consumer is able to delete his/her account with the company, but the company may continue to keep some of the consumer's data; and/or consumer is able to delete his/her account and all of the consumer's information will be removed from the company's servers/databases.

The above practices/policies are examples of the many practices/policies that may be used in determining the company privacy score. Various other elements may be used in determining the company privacy policies in accordance with the disclosure herein.

As an example of how a company privacy score may be calculated by privacy score engine 337, if a company stores data securely, allows consumers to delete specific personal information, and allows the consumer to delete his/her account with the company while the company keeps some of the consumer's data, the company score may be calculated by adding one point for each of these practices/policies. Continuing this example, the privacy score engine 337 may determine that the company privacy score has met three out of the five example practices/policies. Accordingly, the privacy score may be determined to be "3".

In some embodiments, this score may be presented to the consumer as "3", or "3/5" or "0.60", for example. In some embodiments, the company privacy score may be adjusted to a value between zero and one hundred and/or shown to a consumer as a percentage, such as "60%". In some other embodiments, the company privacy score may be mapped or converted using various scales to a letter grade, for example, such as A-F, where an "A" represents a good score, while an "F" represents a bad, or failing, score. In the example above, it may be determined that a 60% maps to a letter grade of "C", for example. In various embodiments, colors and/or shapes may be used to further visually differentiate between a good company privacy score and poor company privacy score.

In some embodiments, the company privacy score may be determined, at least in part, by subtracting one or more points for each of a number of company practices and/or policies that have been determined to be detrimental to protecting a consumer's privacy. For example, one or more points may be deducted from a company privacy score for any of the following practices:

The company has had a data breach within a recent period;

The company collects consumer's personal information related to certain personal information categories (e.g. the company collects the consumer's location information, birth date, address, or marital status);

The company uses collected personal information in certain ways. For example, the company uses consumer personal information to target the consumer with advertising;

The company has lapses in data security—the company does not use secure data storage, and/or does not limit data to employees on a need-to-know basis, etc.;

The company shares or receives information from a digital partner (third party); and/or The company or the digital partner retains consumer data for an indefinite amount of time.

In some embodiments, the privacy score engine 337 may add and subtract points as disclosed above in order to determine a company privacy score. In some other embodiments, the privacy score engine 337 may determine a company privacy score by subtracted points from a starting value, such as from "1 00."

In some embodiments, one or more of the standards/practices may be weighted differently from the others, depending upon numerous factors. For example, a recent data breach may cause subtraction of three points (x3), while the storing of data in an encrypted format may cause addition of two points (x2). Various weighting schemes are possible and are contemplated according to the disclosure herein.

In some embodiments, companies may be monitored or evaluated continuously, or at various intervals, and their company privacy scores may be adjusted according to updated information regarding company practices/policies. For example, if it is determined that a company has had a new data breach, the company's privacy score may be lowered based on a calculation using this new information. In these embodiments, the cyber-privacy system 201 determine a trend in the company privacy score, including a current company privacy score and at least one previous company privacy score, and may output information indicative of the trend for display to a consumer. In some embodiments, additional information may be output to describe a reason for the trend in the company privacy score.

In some embodiments, the cyber-privacy system 201 may determine one or more alternate companies having a higher privacy score than the companies associated with the consumer's accounts and which may provide a similar product or service as the listed company. In these embodiments, the cyber-privacy system 201 may provide information indicative of these one or more companies. This may enable a consumer to choose to interact with a company having a higher privacy score, which may lead to better protection of the consumer's privacy.

In some embodiments, cyber-privacy account analysis system 303 may also determine a consumer privacy score. In some embodiments, privacy score engine 337 may calculate a consumer privacy score based, for example, on the company privacy scores for each company associated with a consumer's account. In some embodiments, the consumer privacy score may be calculated as an average of the company privacy scores. Various other means, weightings, and components for use in calculating the consumer privacy score are contemplated in accordance with the disclosure herein.

In some embodiments, the consumer privacy score may be adjusted to a value between zero and one hundred and/or shown to a consumer as a percentage, such as "45%". In some other embodiments, the consumer privacy score may be mapped or converted using various scales to a letter grade, for example, such as A-F, where an "A" represents a good score while an "F" represents a bad, or failing, score.

In some embodiments, in order to help in the consumer's understanding, the consumer privacy score may be scaled, mapped, and/or presented in same or similar manner to the company privacy score, as described above.

In some embodiments, an adjusted consumer privacy score may be calculated based on input from the consumer regarding an importance, or lack of importance, of certain company standards/practices. For example, a consumer may specify to the cyber-privacy system 201 that the collection and sharing of location information is not of concern to the consumer, and accordingly, the privacy score engine 337 may adjust the company privacy scores, and may determine an adjusted consumer privacy score, based on the adjusted company privacy scores.

In some embodiments, the cyber-privacy system 201 may determine a consumer's data value, which may provide the consumer with an indication of what the consumer's personal data may be worth to a particular company. In some embodiments, the cyber-privacy system 201 may calculate a consumer's data value based on financial data associated with a company. For example, if a company makes its annual revenue from the sale of consumer information, and if the company possesses consumer information for a determined number of consumers, then the cyber-privacy system 201 may determine a consumer's data by dividing the company's annual revenue by the number of consumers. Various other means for determining the consumer data value in accordance with the disclosure herein will readily occur to those skilled in the art. In some embodiments, the cyber-privacy system 201 may output the consumer data value for display to the consumer. The consumer may benefit from knowing their data value because it may enable them to negotiate with the company, for example, for payment or for services. In some embodiments, an additional value score may be determined based on the consumer's data value and the company's privacy score.

In some embodiments, the company privacy score and/or the consumer privacy score may be used in an insurance premium or rate calculation. For example, it may be determined that a consumer with a higher privacy score poses less of a loss risk to an insurance company and the consumer may be offered lower cost insurance coverage. In some embodiments, premiums and/or deductibles for insurance policies may be established based on a consumer's privacy score and/or a consumer's data value. In some instances, the determined consumer privacy score may be made available through a marketplace in alignment with industry best practices and consumer consent as mandated by law. An insurer may pay to have access to the marketplace in order to better tailor insurance products for a consumer based on an associated risk. An advertiser may use the consumer privacy score in developing anonymized demographic information for targeted advertising. For example, an advertiser may determine a demographic of consumers aged 20-28 who have consumer privacy scores below a certain level in order to conduct a targeted advertising campaign for a new social network, because those consumers may be more inclined to receiving such advertisements. In some instances, access to the marketplace may be restricted and/or incur a fee. For example, a fee may be charged to access consumer privacy scores collected by the cyber-privacy system 201.

In another embodiment, the cyber-privacy system 201 may determine if an action event has been detected. An action event may comprise a detected change in a consumer account and/or detection of a data breach. For example, a consumer may register a new account online, or start using a password manager. As a result of the action, the cyber-privacy system 201 may rescan or otherwise revise the list of consumer accounts.

In some embodiments, a web browser plug-in may be provided which, in coordination with the cyber-privacy system 201, may enable a consumer to easily view a company's privacy score when they visit the company's website or before they visit a company's website via a web browser. For example, in some embodiments, the browser plug-in may be automatically invoked after a consumer navigates to a company's website. In some other embodiments, when a consumer visits a company's website, the consumer may select a browser menu item or otherwise invoke the browser plug-in to see the company's privacy score. In some other embodiments, prior to visiting a company's website, the consumer may select a browser menu item or otherwise invoke the browser plug-in to see the company's privacy score. In addition to, or instead of, displaying the company privacy score, the browser plug-in may display other information about the company or about the company's privacy score or privacy practices/policies.

In some embodiments, a consumer may navigate to, or request a privacy score of, a website of a company that does not yet have a score. In these embodiments, the browser plug-in may enable the consumer to submit the name of the company to the cyber-privacy system 201 so that it can be scored.

In some embodiments, a consumer may inform the cyber-privacy system 201 that they do, or do not, want companies to gather and/or store certain categories of personal information (for example, location information). In these embodiments, when a consumer visits a website of a company whose policies are in conflict with the consumer's wishes, the browser plug-in may alert the consumer that the company is not in compliance with these wishes.

Figure 4:
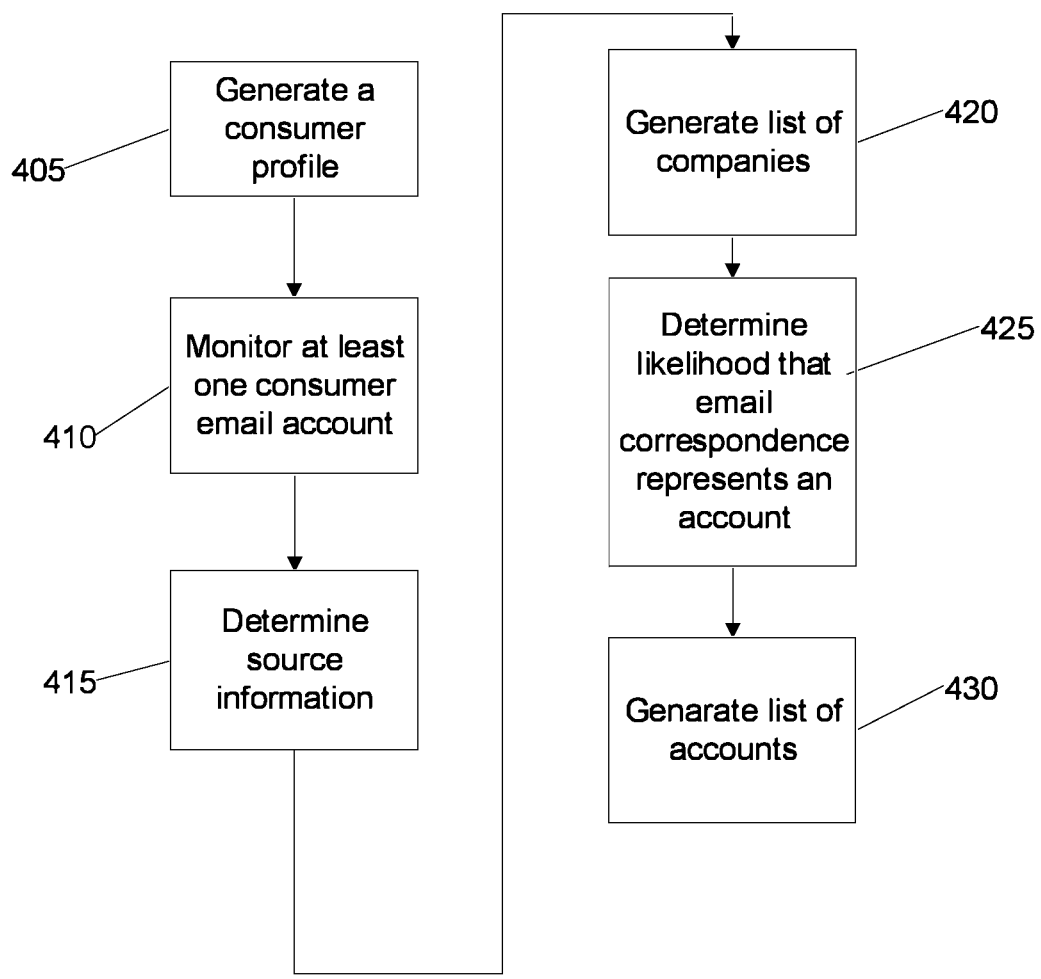
FIG. 4 illustrates an exemplary method for identifying and categorizing accounts associated with a consumer in accordance with one or more aspects described herein.

FIG. 4 depicts a method for assisting a consumer in keeping track of a consumer's accounts in order to provide company privacy scores associated with each account. The discovered accounts may be displayed to the consumer along with company privacy scores, as will be discussed below.

At step 405, cyber-privacy system 201 may generate a consumer profile based on received and collected consumer information. The consumer information may be collected by cyber-traffic event analysis system 222 which may continuously scan for updated consumer information (addresses, credit card numbers, credentials, social security numbers, etc.).

Cyber-privacy system 201 at step 410 may monitor at least one email account of the consumer. In some embodiments, the email account may be monitored on an email server. In some embodiments, the email account may be monitored on a consumer device, for example, by scanning the consumer device. A consumer's email password and access information may have been provided by the consumer during an account setup process. The cyber-privacy system 201 may parse, at step 415, the metadata found in each email header to determine source information for each email correspondence in the consumer's email account. The parsed metadata may include a domain name identifying the source of the email correspondence. In an embodiment, monitoring of the consumer's email account may be limited to a consumer's inbox or specified folders containing email correspondence. In an embodiment, based on the determined source information for each email correspondence, cyber-privacy system 201 may at step 420 generate a list of companies associated with a consumer. In one embodiment, this list may also be created using the analysis of a consumer's email and checking the information against application programming interfaces, such as Yodlee. The list of companies may be verified with the consumer profile or other gathered information regarding the consumer. The list of companies may be displayed to the consumer.

At step 425, cyber-privacy system 201 may determine for each email correspondence a likelihood that each email correspondence represents an account of the consumer. Cyber-privacy system 201 may in at least one embodiment, determine that an email contains references to an existing account based on results from a pattern recognition algorithm, such as natural language processing, performed by the pattern matching engine 335. The pattern recognition algorithm may search for various words, phrases, or other identifiable criteria. For instance, the pattern recognition algorithm may search for the word unsubscribe in an email correspondence indicating that the email correspondence is associated with an existing account.

In another embodiment, based on the determined likelihood that each email correspondence represents an account of the consumer, cyber-privacy system 201 at step 430 may generate a list of accounts associated with the consumer. The generated list of accounts may be displayed to the consumer and stored in the consumer profile record.

In an embodiment, cyber-privacy system 201 may generate recommendations based on the identification of the sources of the accounts. In another embodiment, the consumer may determine that various accounts should be closed based on a review of the listings. In this case, a consumer may indicate via a user interface that various accounts should be closed and cyber-privacy system 201 may begin an account closing process for the consumer.

In an embodiment, a consumer's email account may be monitored at a predetermined frequency in order to update the account listings. The newly generate lists may be compared to previously generated lists highlighting changes for the consumer. In this way, the process may be iterative. In yet another embodiment, cyber-privacy system 201 may learn to identify false positives as it repeatedly scans email accounts and receives feedback from consumers.

Figure 5:
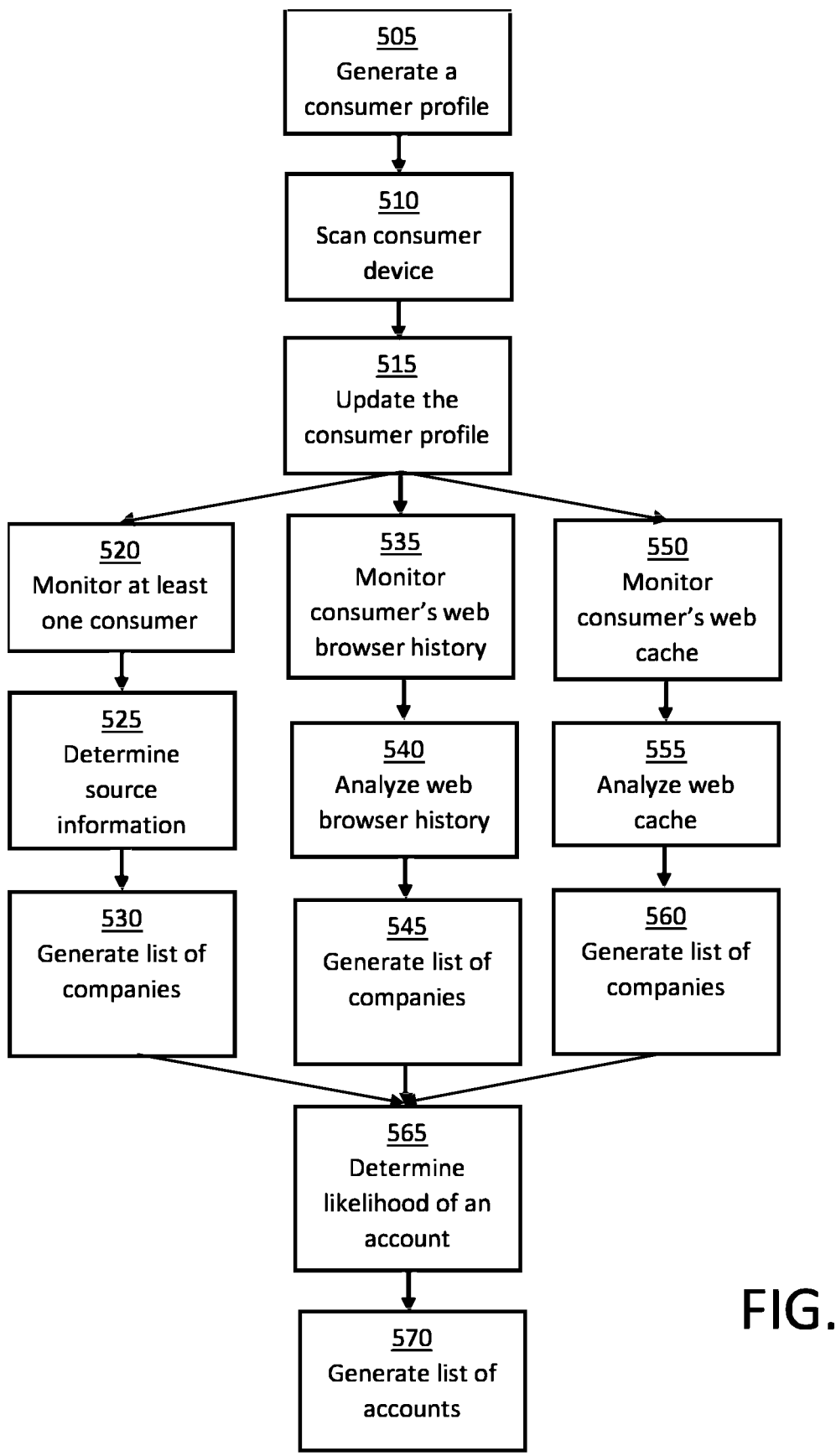
FIG. 5 illustrates an exemplary method for identifying and categorizing accounts associated with a consumer in accordance with one or more aspects described herein.

FIG. 5 depicts another method for assisting a consumer in keeping track of a consumer's accounts. At step 505, cyber-privacy system 201 may generate a consumer profile based on received and collected consumer information. The consumer information may be collected by cyber-traffic event analysis system 222 which may continuously scan for updated consumer information (addresses, credit card numbers, credentials, social security numbers, etc.).

At step 510, cyber-privacy system 201 may scan a consumer device to determine characteristics of the consumer device. The determined characteristics may include operating system version, update history, installed software, hardware characteristics, and so forth.

At step 515, cyber-privacy system 201 may associate the consumer device and the results of the scan with the generated consumer profile. In an embodiment, cyber-privacy system 201 may update the consumer profile based on the results of the scan.

At step 520, cyber-privacy system 201 may monitor at least one email account of the consumer. A consumer's email password and access information may have been provided by the consumer during an account setup process. At step 525, the cyber-privacy system 201 may parse the metadata found in each email header to determine source information for each email correspondence in the consumer's email account. The parsed metadata may include a domain name identifying the source of the email correspondence. In an embodiment, monitoring of the consumer's email account may be limited to a consumer's inbox or specified folders containing email correspondence. Cyber-privacy system 201 may also determine that an email contains references to an existing account based on results from a pattern recognition algorithm, such as natural language processing. The pattern recognition algorithm may search for various words, phrases, or other identifiable criteria. For instance, the pattern recognition algorithm may search for the word unsubscribe in an email correspondence indicating that the email correspondence is associated with an existing account. Based on the analysis of a consumer's email correspondence, cyber-privacy system 201 may at step 530 generate a list of businesses a consumer may have an account with. In one embodiment, this list may also be created using the analysis of a consumer's email and checking the information against application programming interfaces, such as Yodlee.

At step 535, cyber-privacy system 201 may monitor a consumer's web browser history, including cookies. This could be done over a consumer's various browsers (e.g., Chrome, Internet Explorer, Firefox). At step 540, the cyber-privacy system 201 may analyze which websites a consumer visited, which websites stored cookies on a consumer's device, how frequently a consumer visited specific websites, or how recently a consumer visited a website. Based on a consumer's web browsing activity, cyber-privacy system 201 may generate a list of companies associated with a consumer (i.e., step 545). Further, cyber-privacy system 201 may order the list of companies associated with a consumer based on likelihood the consumer has an account with a particular company. For instance, websites that the consumer visits more frequently and/or more recently may be placed higher on the list as they may indicate a stronger likelihood the consumer has an account with that particular company. In one embodiment, this list may also be created using the analysis of a consumer's web browser history and checking the information against application programming interfaces, such as Yodlee.

At step 550, cyber-privacy system 201 may monitor a consumer's web cache. This, again, could be done for a consumer's various browsers (e.g., Chrome, Internet Explorer, or Firefox). At step 555, the cyber-privacy system 201 may analyze a consumer's web cache to pass along data to create generate a list of companies associated with a consumer (i.e., step 560). In one embodiment, this list may also be created using the analysis of a consumer's web cache and checking the information against application programming interfaces, such as Yodlee.

At step 565, cyber-privacy system 201 analyzes the three lists generated from steps 530, 545, and 560 to determine a likelihood that each business represents a company that the consumer has an account with. Cyber-privacy system 201 may, in at least one embodiment, determine that a consumer has an account with a certain business because it appears on all three lists. Alternatively, a company that only appears on the list associated with a consumer's browser history may not indicate that the consumer has an account with that business. Cyber-privacy system 201 may place different weights on the various lists in determining whether a consumer has an account with a certain company. For instance, cyber-privacy system 201 may determine that a consumer has an account with a particular business if that particular business appears on the lists generated from the analysis of a consumer's email and web browsing history. In comparison, cyber-privacy system 201 may determine a consumer does not have an account with a particular business even though that particular business appears on the lists generated from the analysis of a consumer's web browsing history and web cache.

In an alternative embodiment, cyber-privacy system 201 may use the lists generated in steps 545 and 560 to verify the list generated in step 530, which was based on the analysis of a consumer's email account. In this embodiment, cyber-privacy system 201 may use the lists generated at steps 545 and 560 to filter out false positives and increase the accuracy of the list generated in step 530.

At step 570, cyber-privacy system 201 may generate a summary list based on its analysis in step 565. This list of companies may be categorized by type, subject matter, or nature of use to provide an indication of how a consumer uses the internet. This list of companies may also be verified with the consumer profile or other gathered information regarding the consumer. The list of companies may be also displayed to the consumer.

In another embodiment, based on the determined likelihood that a consumer has an account with each company, cyber-privacy system 201 may generate a list of companies associated with the consumer along with a list of possible accounts. The generated list of associated companies and possible accounts may be displayed to the consumer and stored in the consumer profile record. This list of associated companies and possible accounts may be categorized by type, subject matter, or nature of use.

In an embodiment, cyber-privacy system 201 may generate recommendations based on the identification of the sources of the accounts. In another embodiment, the consumer may determine that various accounts should be closed based on a review of the listings and may indicate via a user interface that various accounts should be closed and cyber-privacy system 201 may begin an account closing process for the consumer.

In yet another embodiment, cyber-privacy system 201 may include systems or methods to monitor a consumer's accounts to determine whether an account had been breached. Upon detecting a breach, or upon receiving such information from a breach database, cyber-privacy system 201 may provide the consumer with a notice of the breach and information about the extent of the breach.

In an embodiment, a consumer's email account, web browsing history, and web cache may be monitored at a predetermined frequency in order to update the account listings. The newly generate lists may be compared to previously generated lists highlighting changes for the consumer. In this way, the process may be iterative.

In another embodiment, cyber-privacy system 201 may learn to identify false positives as it repeatedly scans the various consumer information and receives feedback from consumers. These accounts may be selected by the consumer via a user interface so that false positives are further reduced.

Figure 6:
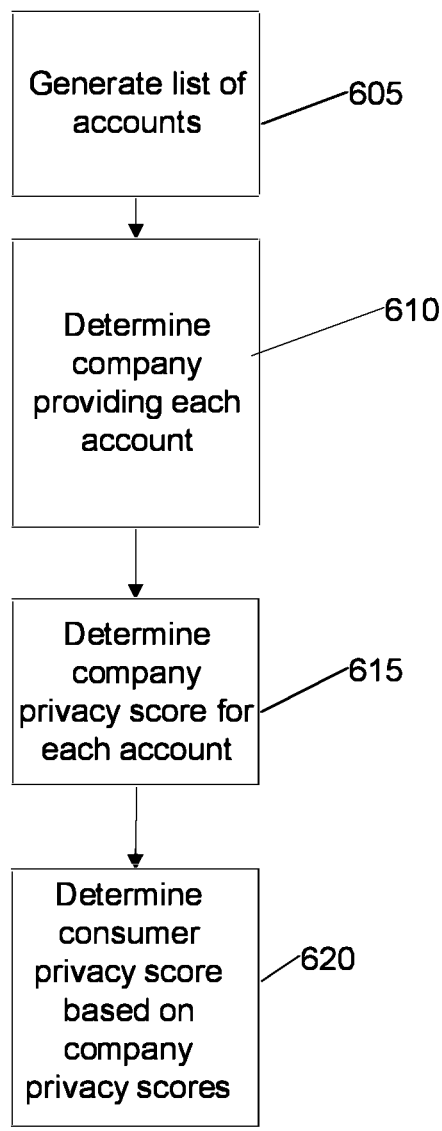
FIG. 6 illustrates an exemplary method for determining company privacy scores associated with a consumer's accounts and for determining the consumer's privacy score in accordance with one or more aspects described herein.

FIG. 6 depicts a method for determining company privacy scores corresponding to a consumer's accounts and for determining the consumer's privacy score. At step 605, cyber-privacy system 201 may generate a list of the consumer's accounts. For example, cyber-privacy system 201 may perform the steps as shown in FIG. 4 or FIG. 5 to generate the list of accounts.

At step 610, cyber-privacy system 201 may determine what company provides each account. In some embodiments, cyber-privacy system 201 may determine that a subsidiary of a company is providing an account and, in this case, the cyber-privacy system 201 may identify the subsidiary.

At step 615, cyber-privacy system 201 may determine a company privacy score corresponding to each company. In cases where a subsidiary has been identified, the cyber-privacy system 201 may determine a company privacy score corresponding to the subsidiary. The company privacy scores may be output by the cyber-privacy system 201 for display to the consumer, for example via a website. In some embodiments, the cyber-privacy system 201 may convert or map the company privacy scores to a letter grade or other representation, as described above. For example, the cyber-privacy system 201 may map the company privacy scores to the grades A-F and output the letter grades for display to the consumer. In some embodiments, the cyber-privacy system 201 may use colors to further differentiate among the company privacy scores. For example, the cyber-privacy system 201 may assign a green color to be used in displaying a letter grade corresponding to "A", while assigning a red color to be used in displaying a letter grade of "F." In some embodiments, the cyber-privacy system 201 may output graphical indications, such as segmented shapes where the number or color of segments may indicate or differentiate the company privacy scores.

At step 620, cyber-privacy system 201 may determine a consumer privacy score based at least in part on the company privacy scores. In some embodiments, the cyber-privacy system 201 may calculate the consumer privacy score by averaging the company privacy scores corresponding to the consumer's accounts. Similar to the above, the cyber-privacy system 201 may convert or map the consumer privacy score from a numeric value to a letter grade and, in various embodiments, may use colors or shapes to further differentiate between a good score and poor score.

In some embodiments, the cyber-privacy system 201 may determine a consumer privacy score trend based on the current consumer privacy score and one or more previous consumer privacy scores. For example, if a numeric value of the consumer's privacy score has risen from 80 to 88, the cyber-privacy system 201 may determine that the consumer's privacy score has improved by 10%. In some embodiments, the cyber-privacy system 201 may output the consumer privacy score trend for display to the consumer.

Figure 7:
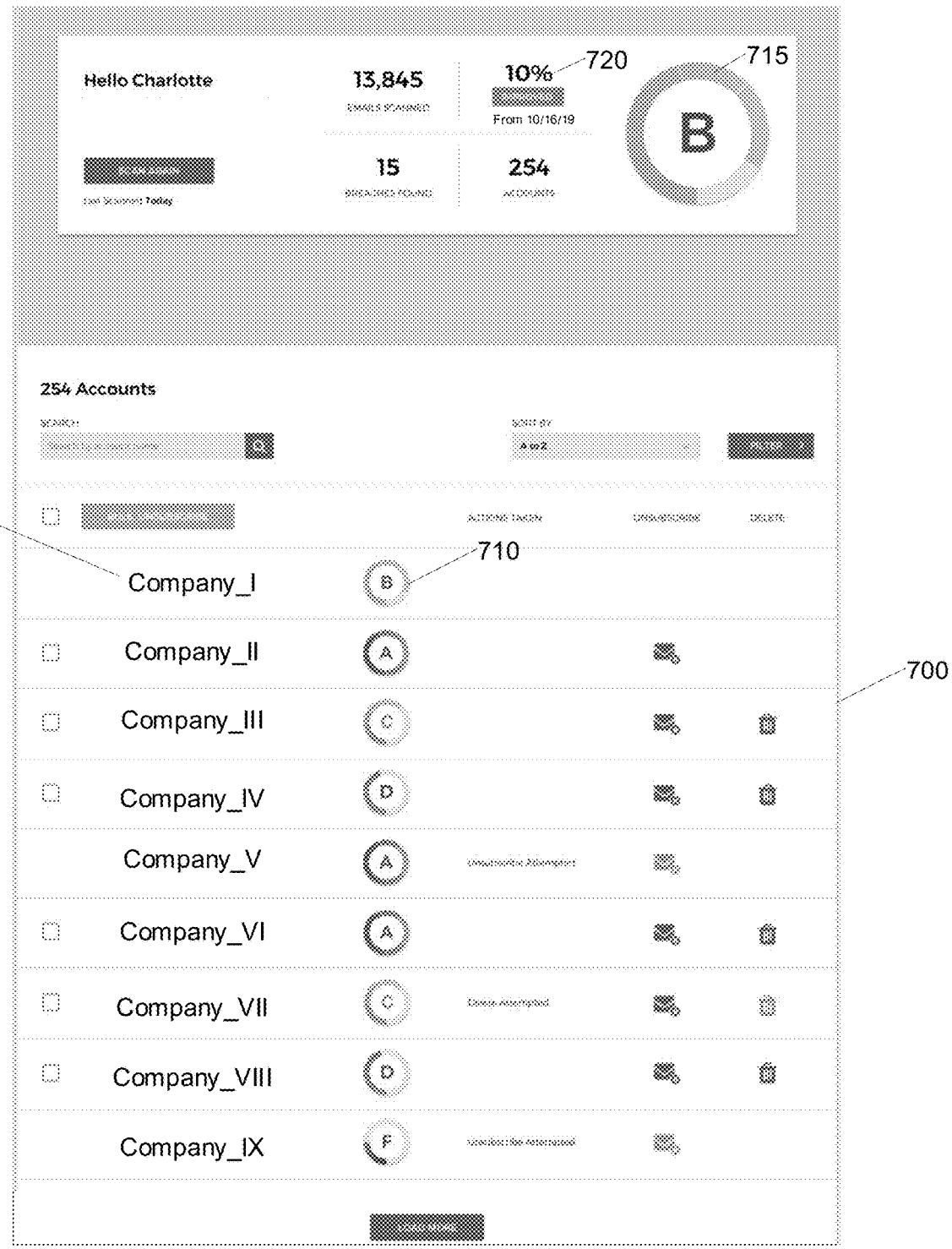
FIG. 7 illustrates an example user interface displaying company privacy scores and the consumer privacy score in accordance with one or more aspects described herein.

FIG. 7 depicts an example user interface 700 as may be output by the cyber-privacy system 201 in order to display company privacy scores and/or the consumer privacy score. The cyber-privacy system 201 may provide a listing of accounts 705 which may indicate the companies with which the consumer has an account. An exemplary number of accounts are depicted in FIG. 7. The companies may be listed using company names, Uniform Resource Locators (URLs), and/or symbols representing each company. Various other means in representing the companies/accounts may be practiced in accordance with the disclosure herein. The cyber-privacy system 201 may provide company privacy scores 710 to inform the consumer of the company privacy score corresponding with each account. As disclosed above, the company privacy scores 710 may be presented in any of a number of ways, including by numeric value, letter grade, color, and/or by use of various symbols.

The cyber-privacy system 201 may output a consumer privacy score 715 to inform the consumer of his/her own privacy score. As disclosed above, in some embodiments, the consumer privacy score may be calculated by cyber-privacy system 201 from the company privacy scores. In some embodiments, the cyber-privacy system 201 may output the consumer privacy score to be presented in a visual manner, similar to the manner in which the company privacy scores are presented. For example, the consumer privacy score 715 may be presented in any of a number of ways, including by numeric value, letter grade, color, and/or by use of various symbols.

The cyber-privacy system 201 may, in some embodiments, output consumer privacy score trend 720 to inform the consumer of a trend related to their privacy score. In various embodiments, additional information may be output with the trend, such as a date from which the trend was calculated, an indication of why the score changed, and/or an indication regarding whether the trend was an improvement or not, for example.

Figure 8:
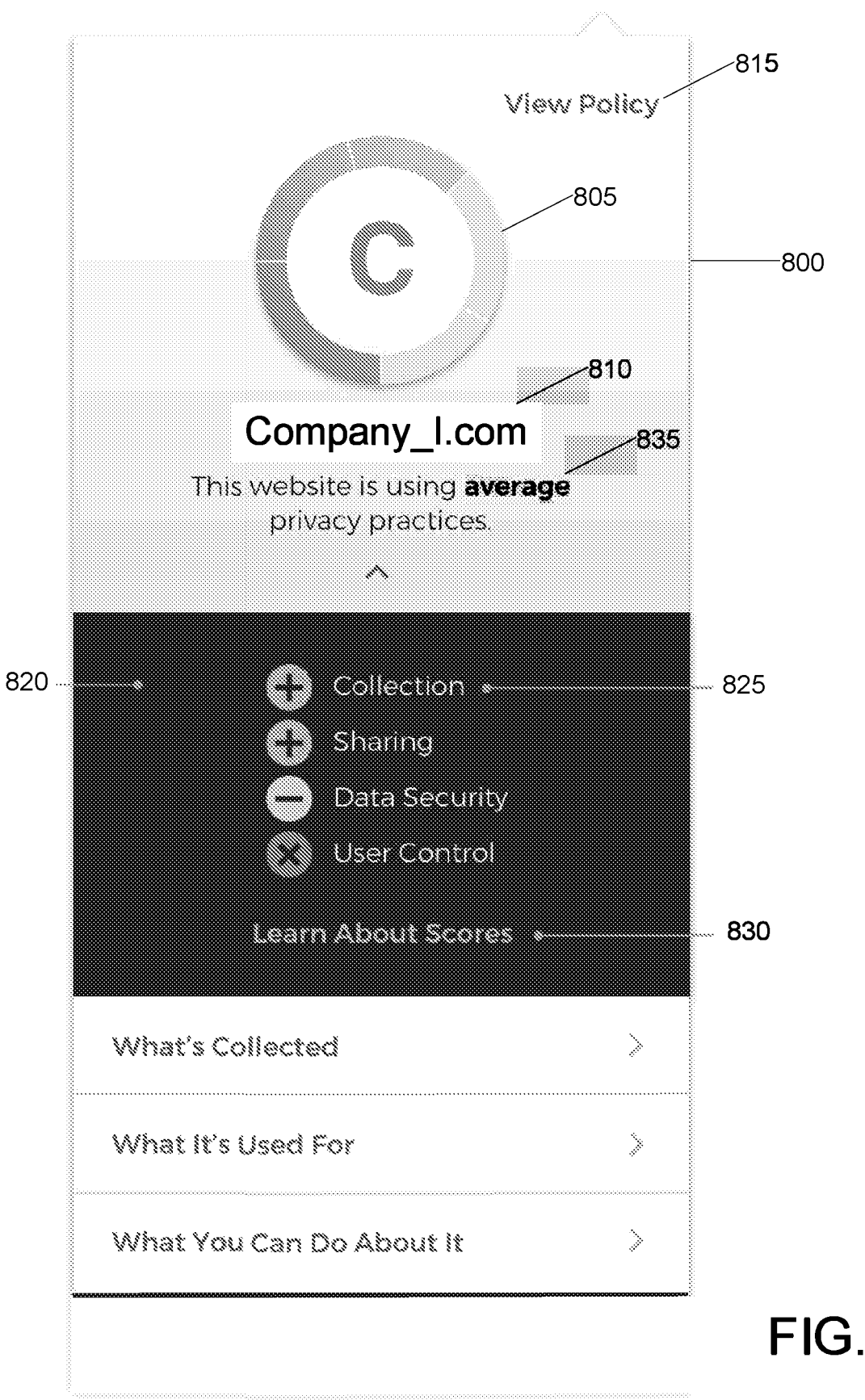
FIG. 8 illustrates an example user interface displaying a company privacy score and related information in accordance with one or more aspects described herein.

FIG. 8 depicts an example browser plug-in user interface 800 as disclosed above. The browser plug-in may execute on a consumer's device, as part of a web browser or other application, and may be in communication with the cyber-privacy system 201 in order to receive company privacy scores.

In some embodiments, when a consumer uses a computing device, such as user computing device 208, to visit a URL corresponding to a company, the browser plug-in may retrieve information related to the company from the cyber-privacy system 201. The browser plug-in may display the company's privacy score 805, for example, in a pop-up window in the consumer's web browser. The browser plug-in may display the company's name, website URL 810, and other identifying information, and in some embodiments, may provide further description 835 of the company's privacy score. In some embodiments, the cyber-privacy system 201 may determine one or more alternate companies having a higher privacy score than the company visited and which may provide a similar product or service as the visited company. In these embodiments, the browser plug-in may provide information indicative of these one or more companies and may enable the consumer to select a URL, for example, to visit a website of one of these companies. This may enable the consumer to choose to interact with a company having a higher privacy score, which may lead to better protection of the consumer's privacy.

In some embodiments, the browser plug-in may provide information summarizing what consumer personal information is being collected, how and/or to whom the information is being shared with, and how the information may be used. The browser plug-in may provide link 815, which the consumer may select to view the company's privacy policies in more detail.

The browser plug-in may display a detailed information section 820, in which scores 825 of various categories of the company's privacy policy and/or privacy practices may be illustrated. For example, if the company scores favorably in privacy categories "collection" and "sharing", then positive indications of these scores may be presented by the browser plug-in (a "+" is shown in the example of FIG. 8 to represent a positive indication). Continuing the example, neutral or negative indications may be presented by the browser plug-in corresponding to categories of the company's privacy policy which have been scored as neutral or negative (a "−" and a "x" are shown in the example of FIG. 8 to represent a neutral and a negative indication, respectively).

In some embodiments, the browser plug-in may display various other information that may be useful to the consumer. For example, the browser plug-in may display a "Learn About Scores" link 830, which the consumer may select to learn about how the category scores are determined or learn more about the categories.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system for recommending at least one second company over a first company based on a privacy score comparison between the second company and the first company comprising:
    one or more processors configured to:
        receive indication that a user has directed a web browser to a uniform resource locator of a website of the first company;
        determine, based on the uniform resource locator, at least one product or service provided by the first company;
        access a first predetermined privacy score determined for the first company;
        responsive to determining the at least one product or service, determine the at least one second company based on the at least one second company also providing the determined at least one product or service;
        display identifying information of the first company, including the first predetermined privacy score;
        determine whether the at least one second company has a second predetermined privacy score higher than the first score;
        and responsive to determining that the second predetermined privacy score of the at least one second company is higher than the first privacy score, display to the user identification of the at least one second company in conjunction with the recommendation to use at least one of the displayed at least one second companies instead of the first company comprising a selection link to visit the website of the at least one of the displayed at least one second companies.

2. The system of claim 1, wherein at least one of the one or more processors is configured to access a record of predetermined privacy scores for a plurality of companies in order to access the predetermined privacy score for the first company.

3. The system of claim 1, wherein the display of identifying information of the first company, the at least one second company, and the recommendation, includes a pop-up window.

4. The system of claim 1, wherein the display of identification of the at least one second company includes display of the second privacy score for the at least one second company.

5. The system of claim 1, wherein the display of identification of the at least one second company includes a selectable option to navigate to a website of the at least one second company.

6. A method for recommending at least one second company over a first company based on a privacy score comparison between the second company and the first company comprising:
    receiving indication that a user has directed a web browser to a uniform resource locator of a website of the first company;
    determining, based on the uniform resource locator, at least one product or service provided by the first company;
    accessing a first predetermined privacy score determined for the first company;
    responsive to determining the at least one product or service, determine the at least one second company based on the at least one second company also providing the determined at least one product or service;
    displaying identifying in formation of the first company, including the first predetermined privacy score;
    determining whether the at least one second company has a second predetermined privacy score higher than the first score;
    and responsive to determining that the second predetermined privacy score of the at least one second company is higher than the first privacy score, displaying to the user identification of the at least one second company in conjunction with the recommendation to use at least one of the displayed at least one second companies instead of the first company comprising a selection link to visit the website of the at least one of the displayed at least one second companies.

7. The method of claim 6, further comprising accessing a record of predetermined privacy scores for a plurality of companies in order to access the predetermined privacy score for the first company.

8. The method of claim 6, wherein the displaying of identifying information of the first company, the at least one second company, and the recommendation, includes a pop-up window.

9. The method of claim 6, wherein the displaying identification of the at least one second company includes displaying the second privacy score for the at least one second company.

10. The method of claim 6, wherein the displaying identification of the at least one second company includes a selectable option to navigate to a website of the at least one second company.

* * * * *